United States Patent
Hong (10) Patent No.: US 11,191,017 B2
(45) Date of Patent: Nov. 30, 2021

(54) METHOD AND APPARATUS FOR CAMPING ON CELL, USER EQUIPMENT, AND BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/956,947

(22) PCT Filed: Dec. 29, 2017

(86) PCT No.: PCT/CN2017/119969
§ 371 (c)(1),
(2) Date: Jun. 22, 2020

(87) PCT Pub. No.: WO2019/127414
PCT Pub. Date: Jul. 4, 2019

(65) Prior Publication Data
US 2021/0007044 A1    Jan. 7, 2021

(51) Int. Cl.
*H04W 36/32* (2009.01)
*H04W 48/20* (2009.01)
(Continued)

(52) U.S. Cl.
CPC ..... *H04W 48/20* (2013.01); *H04W 36/00835* (2018.08); *H04W 36/00837* (2018.08);
(Continued)

(58) Field of Classification Search
CPC ........... H04W 48/20; H04W 36/00835; H04W 36/08; H04W 36/32; H04W 48/10; H04W 64/006
See application file for complete search history.

(56) References Cited

U.S. PATENT DOCUMENTS

2013/0053038 A1   2/2013  Lee et al.
2014/0220984 A1*  8/2014  Mandapaka .......... H04W 36/32
                                                   455/440
(Continued)

FOREIGN PATENT DOCUMENTS

CN    1503580 A    6/2004
CN    101170830 A  4/2008
(Continued)

OTHER PUBLICATIONS

ISA State Intellectual Property Office of the People's Republic of China, International Search Report Issued in Application No. PCT/CN2017/119969, dated Aug. 29, 2018, WIPO, 4 pages.
(Continued)

*Primary Examiner* — Barry W Taylor
(74) *Attorney, Agent, or Firm* — Syncoda LLC; Feng Ma (57) ABSTRACT

A method of camping on a cell includes: for selecting a cell to camp, determining a movement speed of user equipment (UE); determining a cell to be camped on based on movement speed of the UE and respective expected speed information of UE to be served by one or more cells capable of being camped on; and camping on the cell to be camped on. The UE can therefore be enabled to select a cell to be camped on suitable for the UE's current movement speed according to the expected speed of UE to be served by a network.

15 Claims, 7 Drawing Sheets

(51) Int. Cl.
*H04W 36/00* (2009.01)
*H04W 36/08* (2009.01)
*H04W 48/10* (2009.01)
*H04W 64/00* (2009.01)

(52) U.S. Cl.
CPC ........... *H04W 36/08* (2013.01); *H04W 36/32* (2013.01); *H04W 48/10* (2013.01); *H04W 64/006* (2013.01)

(56) References Cited

U.S. PATENT DOCUMENTS

| | | | |
|---|---|---|---|
| 2015/0208377 A1 | 7/2015 | Han et al. | |
| 2018/0167856 A1* | 6/2018 | Li | H04W 36/0088 |
| 2019/0007883 A1* | 1/2019 | Dang | H04W 36/36 |
| 2019/0357099 A1* | 11/2019 | Xu | H04W 36/32 |
| 2020/0236605 A1* | 7/2020 | Yiu | H04W 36/24 |
| 2021/0160753 A1* | 5/2021 | Zhang | H04W 48/18 |

FOREIGN PATENT DOCUMENTS

| | | |
|---|---|---|
| CN | 102958123 A | 3/2013 |
| CN | 103765957 A | 4/2014 |
| CN | 105142194 A | 12/2015 |
| CN | 105491636 A | 4/2016 |
| CN | 105519190 A | 4/2016 |
| CN | 106332197 A | 1/2017 |
| WO | 2015039687 A1 | 3/2015 |

OTHER PUBLICATIONS

State Intellectual Property Office of the People's Republic of China, Office Action and Search Report Issued in Application No. 201780002381.9, dated Aug. 2, 2021, 24 pages.

Ericsson, ST-Ericsson, "Measurements for small cells in UMTS", 3GPP TSG RAN WG2 #83 Barcelona, Spain, R2-132707, Aug. 19-23, 2013, 6 pages.

* cited by examiner

METHOD AND APPARATUS FOR CAMPING ON CELL, USER EQUIPMENT, AND BASE STATION

CROSS-REFERENCE TO RELATED APPLICATION

This application is a national stage of International Application No. PCT/CN2017/119969 filed on Dec. 29, 2017, the disclosure of which is hereby incorporated by reference in its entirety.

TECHNICAL FIELD

The present disclosure relates to the field of communication technology, and in particular, to a method and apparatus for camping on a cell, user equipment (UE), and a base station.

BACKGROUND

With the rapid development and deployment of high-speed railways around the world, service operators select to deploy a high-speed-railway dedicated network to satisfy the needs of passengers on high-speed trains for accessing network. Since the high-speed-railway dedicated network may have the same frequency resources as ordinary public mobile networks, and the high-speed-railway dedicated network usually has better network coverage, UE of a user who does not take a high-speed train is often automatically selected to access the high-speed-railway dedicated network, which in turn leads to occurrence of congestion on the high-speed-railway dedicated network and greatly affects communication quality of a passenger who takes the high-speed train. To prevent the user who does not take the high-speed train from accessing the high-speed-railway dedicated network, a new cell camping or re-selection technical solution is needed to ensure that the UE may select or re-select a suitable cell to camp on.

SUMMARY

In order to overcome the problem existing in the related art, examples of the present disclosure provide a method and apparatus for camping on a cell, UE, and a base station, to enable the UE to select a cell to be camped on which is suitable for the UE's current movement speed according to the expected speed of UE to be served by a network.

According to a first aspect of the examples of the present disclosure, a method of camping on a cell is provided, the method is applied to UE, and the method includes:

for selecting a cell to camp, determining a movement speed of the UE;

determining a cell to be camped on based on the movement speed of the UE and respective expected speed information of UE to be served by one or more cells capable of being camped on; and camping on the cell to be camped on.

In an example, the method further includes:

monitoring system signaling broadcast by a base station, wherein the system signaling carries expected speed information of UE to be served by a cell, or carries the expected speed information of UE to be served by the cell and expected speed information of UE to be served by a neighboring cell adjacent to the cell.

In an example, the expected speed information of UE to be served indicates a speed range or the expected speed information of UE to be served indicates a speed level and the system signaling further carries threshold information of speed level for classifying a speed.

In an example, the method further includes:

determining a speed level of the UE based on the threshold information of speed level for classifying the speed.

In an example, determining the cell to be camped on based on the movement speed of the UE and the respective expected speed information of UE to be served by the one or more cells capable of being camped on includes:

in response to that there is only one matching cell among the one or more cells capable of being camped on, determining the matching cell as the cell to be camped on, wherein the matching cell refers to a cell whose expected speed range of UE to be served comprises the movement speed of the UE, or a cell whose expected speed level of UE to be served is the same as the speed level of the UE; and in response to that there are more than two matching cells among the one or more cells capable of being camped on, determining a cell with highest signal quality among the more than two matching cells as the cell to be camped on.

In an example, determining the movement speed of the UE includes:

determining the movement speed of the UE based on a number of times of performing cell re-selection by the UE within a preset time period; or determining the movement speed of the UE based on a movement trajectory within a set time period determined by a positioning module of the UE.

According to a second aspect of the examples of the present disclosure, a method of camping on a cell is provided, the method is applied to a base station, and the method includes:

determining system signaling to be broadcast based on expected speed information of UE to be served; and broadcasting the system signaling.

In an example, the system signaling further carries expected speed information of UE to be served by a neighboring cell; and the method further includes:

obtaining the expected speed information of UE to be served by the neighboring cell through an X2 interface between base stations.

In an example, the expected speed information of UE to be served indicates a speed range; or a speed level the expected speed information of UE to be served indicates a speed level and the system signaling further carries threshold information of speed level for classifying a speed.

According to a third aspect of the examples of the present disclosure, an apparatus for camping on a cell is provided, the apparatus is applied to UE, and the apparatus includes:

a first determining module configured to, for selecting a cell to camp, determine a movement speed of the UE;

a second determining module configured to determine a cell to be camped on based on the movement speed of the UE determined by the first determining module and respective expected speed information of UE to be served by one or more cells capable of being camped on; and a camping module configured to camp on the cell to be camped on determined by the second determining module.

In an example, the apparatus further includes:

a monitoring module configured to monitor system signaling broadcast by a base station, wherein the system signaling carries expected speed information of UE to be served by a cell, or carries the expected speed information of UE to be served by the cell and expected speed information of UE to be served by a neighboring cell adjacent to the cell.

In an example, the expected speed information of UE to be served indicates a speed range; or the expected speed information of UE to be served indicates a speed level and the system signaling further carries threshold information of speed level for classifying a speed.

In an example, the apparatus further includes:

a third determining module configured to determine a speed level of the UE based on the threshold information of speed level for classifying the speed.

In an example, the second determining module includes:

a first determining sub-module configured to, in response to that there is only one matching cell among the one or more cells capable of being camped on, determine the matching cell as the cell to be camped on, wherein the matching cell refers to a cell whose expected speed range of UE to be served comprises the movement speed of the UE, or a cell whose expected speed level of UE to be served is the same as the speed level of the UE; and a second determining sub-module configured to, in response to that there are more than two matching cells among the one or more cells capable of being camped on, determine a cell with highest signal quality among the more than two matching cells as the cell to be camped on.

In an example, the first determining module includes:

a third determining sub-module configured to determine the movement speed of the UE based on a number of times of performing cell re-selection by the UE within a preset time period; or a fourth determining sub-module configured to determine the movement speed of the UE based on a movement trajectory within a set time period determined by a positioning module of the UE.

According to a fourth aspect of the examples of the present disclosure, an apparatus for camping on a cell is provided, the apparatus is applied to a base station, and the apparatus includes:

a fourth determining module configured to determine system signaling to be broadcast based on expected speed information of UE to be served; and a broadcasting module configured to broadcast the system signaling.

In an example, the system signaling further carries expected speed information of UE to be served by a neighboring cell; and the apparatus further includes:

an obtaining module configured to obtain the expected speed information of UE to be served by the neighboring cell through an X2 interface between base stations.

In an example, the expected speed information of UE to be served indicates a speed range; or the expected speed information of UE to be served indicates a speed level and the system signaling further carries threshold information of speed level for classifying a speed.

According to a fifth aspect of the examples of the present disclosure, UE is provided, and the UE includes:

a processor; and a memory for storing instructions executable by the processor, wherein the processor is configured to:

for selecting a cell to camp, determine a movement speed of the UE;

determine a cell to be camped on based on the movement speed of the UE and respective expected speed information of UE to be served by one or more cells capable of being camped on; and camp on the cell to be camped on.

According to a sixth aspect of the examples of the present disclosure, a base station is provided, and the base station includes:

a processor; and a memory for storing instructions executable by the processor, wherein the processor is configured to:

determine system signaling to be broadcast based on expected speed information of UE to be served; and broadcast the system signaling.

According to a seventh aspect of the examples of the present disclosure, a non-transitory computer readable storage medium is provided, the non-transitory computer readable storage medium stores computer instructions, wherein the instructions are executed by a processor to:

for selecting a cell to camp, determine a movement speed of the UE;

determine a cell to be camped on based on the movement speed of the UE and respective expected speed information of UE to be served by one or more cells capable of being camped on; and camp on the cell to be camped on.

According to an eighth aspect of the examples of the present disclosure, a non-transitory computer readable storage medium is provided, the non-transitory computer readable storage medium stores computer instructions, wherein the instructions are executed by a processor to:

determine system signaling to be broadcast based on expected speed information of UE to be served; and broadcasting the system signaling.

The technical solutions provided by the examples of the present disclosure may include the following beneficial effects.

The UE may select the cell to be camped on based on the UE's own movement speed and the expected speed information of UE to be served by each of the one or more cells capable of being camped on. Thus, the UE selects a suitable cell to camp on according to the expected speed information of UE to be served by a network, thereby avoiding a problem that high speed movement UE selects a common public mobile network and cannot meet its own communication needs, and avoiding a problem of congestion on the high-speed-railway dedicated network caused by ordinary movement speed UE to select the high-speed railway dedicated network.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1A:
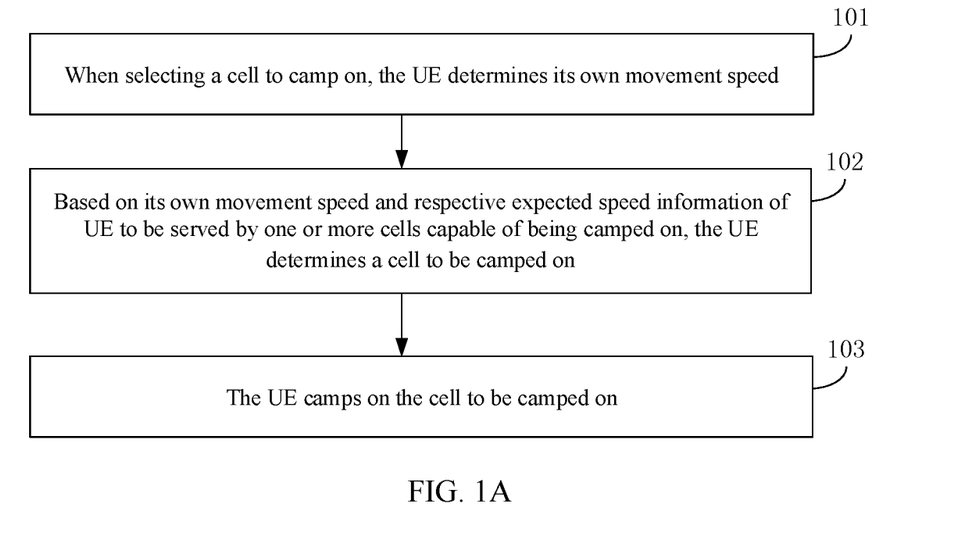
FIG. 1A is a flowchart illustrating a method of camping on a cell according to an example.
Figure 1B:
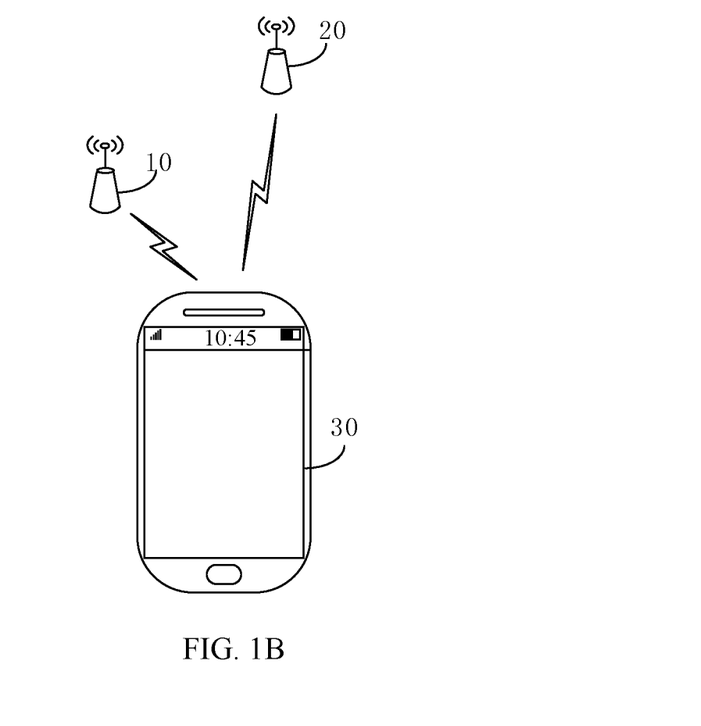
FIG. 1B is an application scenario diagram illustrating a method of camping on a cell according to an example.

FIG. 1A is a flowchart illustrating a method of camping on a cell according to an example. FIG. 1B is an application scenario diagram illustrating a method of camping on a cell according to an example. This method of camping on the cell may be applied to UE. As shown in FIG. 1A, the method of camping on the cell includes the following steps 101-103.

At step 101, when selecting a cell to camp on, the UE determines its own movement speed.

In an example, the UE may determine, through a positioning module, a movement trajectory within a set period of time before the moment of selecting a cell to camp on, and determine its own movement speed based on the movement trajectory. For example, if the movement trajectory of the UE within 10 minutes before the moment of selecting a cell to camp on coincides with a high-speed-railway line, it may be determined that the movement speed of the UE is the running speed of the high-speed train. Alternatively, if the movement trajectory of the UE within 10 minutes before the moment of selecting a cell to camp on indicates that the UE moves 50 km, it may be determined that the movement speed of the UE is 300 km/h.

In an example, the UE may determine the number of times of performing cell re-selection within a preset time period before the moment of selecting a cell to camp on, and determine the movement speed of the UE based on the number of times of performing the cell re-selection. For example, if the UE performs 4 times of the cell re-selection within 5 minutes before the moment of selecting a cell to camp on, it may be determined how far the UE has probably moved based on the approximate coverage of one or more cells and the number of handovers, and the movement speed of the UE may be determined based on a length of the preset time period and an approximate movement distance within the preset time period.

At step 102, based on its own movement speed and respective expected speed information of UE to be served by one or more cells capable of being camped on, the UE determines a cell to be camped on.

In an example, the cell capable of being camped on may be understood as a cell whose signal quality detected by the UE meets camping criteria.

In an example, base station(s) of one or more cells can broadcast the expected speed information of UE to be served by each of the one or more cells through system signaling.

In an example, the expected speed information of UE to be served may be understood as an expected movement speed of UE to be served. For example, the expected speed information of UE to be served by a cell on the high-speed-railway dedicated network is greater than 200 km/h, and the expected speed information of UE to be served by a cell on a mobile network of an ordinary public place is less than 30 km/h.

In an example, the expected speed information of UE to be served may be understood as a speed level of the expected movement speed of the UE to be served. For example, the expected speed information of UE to be served by a cell on the high-speed-railway dedicated network may be high speed, and the expected speed information of UE to be served by a cell on a mobile network of an ordinary public place may be low speed. The speed level may include a low speed, a medium speed, and a high speed. The speed level may be classified based on a threshold broadcast by a base station. UE may determine the speed level of its current movement speed based on the threshold broadcast by the base station. For example, the threshold broadcast by the base station for classifying the speed level includes two thresholds. The first threshold is 30 km/h, and the second threshold is 200 km/h. The UE may determine a speed lower than the first threshold as the low speed, a speed greater than the first threshold and less than the second threshold as the medium speed, and a speed greater than the second threshold as the high speed.

Figure 2:
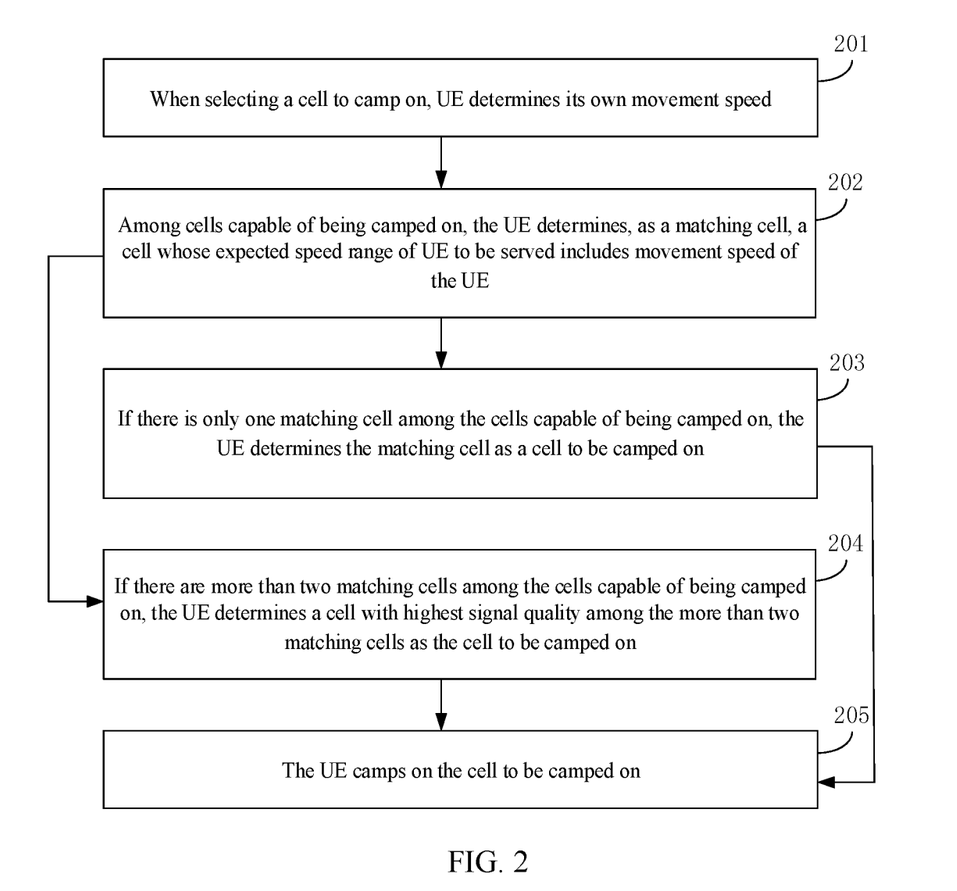
FIG. 2 is a flowchart illustrating another method of camping on a cell according to an example.
Figure 3:
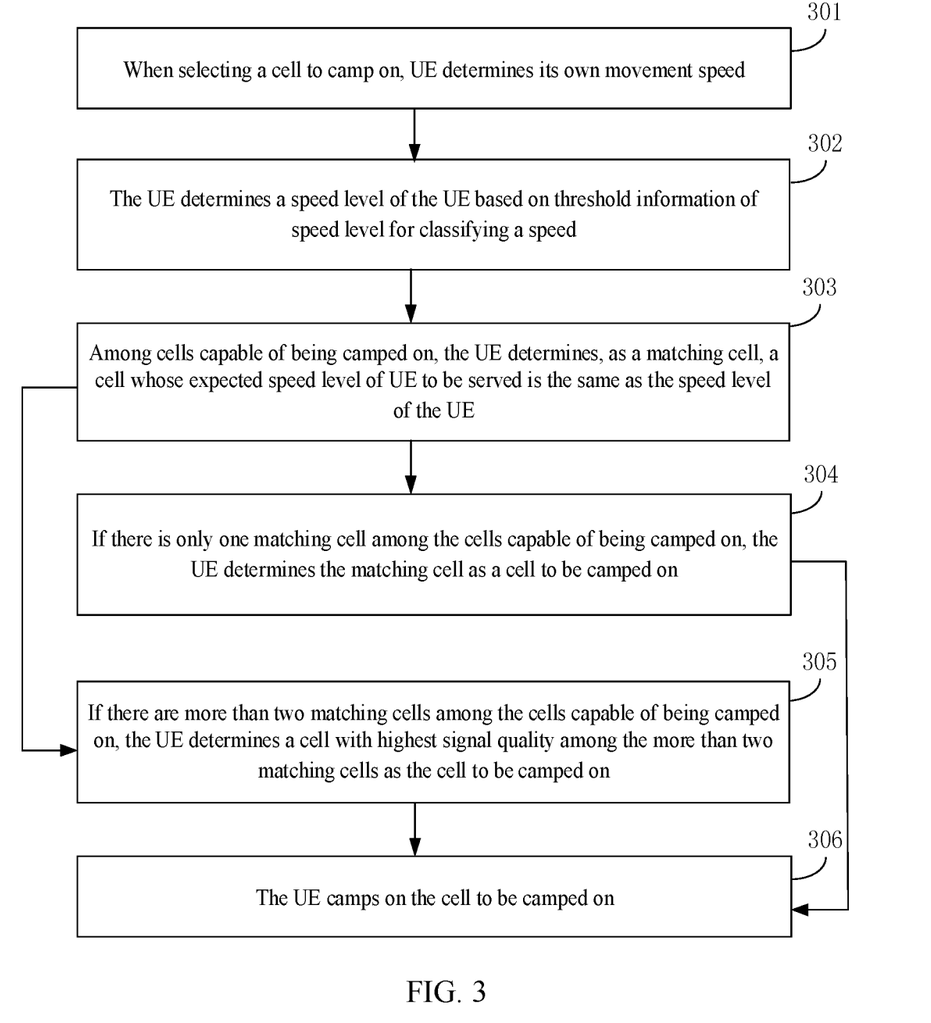
FIG. 3 is a flowchart illustrating still another method of camping on a cell according to an example.

In an example, reference may be made to the examples shown in FIGS. 2 and 3 about the implementation manners for determining the cell to be camped on based on the movement speed of the UE and the expected speed information of UE to be served by each of the one or more cells capable of being camped on, which will not be described in detail here.

At step 103, the UE camps on the cell to be camped on.

In an exemplary scenario, as shown in FIG. 1B, base station 10, base station 20, and UE 30 are included. The expected speed information of UE to be served by base station 10 is the high speed. The expected speed information of UE to be served by base station 20 is the low speed. When UE 30 is to perform cell selection or re-selection, it may detect base station 10 and base station 20 capable of being camped on. If UE 30 is currently moving at a high speed, it may be determined that UE 30 camps on a cell covered by base station 10, so as to avoid a problem that the network cannot meet UE 30's own communications needs caused by camping on a cell covered by base station 20. If UE 30 is currently moving at a low speed, it may be determined that UE 30 camps on the cell covered by base station 20, so as to avoid a problem of congestion on the high-speed-railway dedicated network caused by camping on the cell covered by base station 10.

In this example, through steps 101-103, the UE may select the cell to be camped on based on its own movement speed and the expected speed information of UE to be served by each of the one or more cells. In this way, the UE selects a suitable cell to camp on according to the expected speed information of UE to be served by a network, thereby avoiding a problem that high speed movement UE selects a common public mobile network and cannot meet its own communication needs, and avoiding a problem of congestion on the high-speed-railway dedicated network caused by ordinary movement speed UE to select the high-speed railway dedicated network.

For details about how to perform cell camping, please refer to subsequent examples.

The technical solutions provided by the examples of the present disclosure are described below with specific examples.

FIG. 2 is a flowchart illustrating another method of camping on a cell according to an example. This example, by adopting the method as described above, exemplifies how UE selects a cell to camp on when the expected speed information of UE to be served indicates a speed range. As shown in FIG. 2, this method of camping on the cell includes the following steps.

At step 201, when selecting a cell to camp on, UE determines its own movement speed.

In an example, for the description of step 201, reference may be made to the description of step 101 in the example shown in FIG. 1A, which will not be described in detail here.

At step 202, among cells capable of being camped on, the UE determines, as a matching cell, a cell whose expected speed range of UE to be served includes movement speed of the UE, and steps 203 and 204 are performed.

In an example, the expected speed range of UE to be served indicates an expected movement speed required for the UE to be served.

In an example, the movement speed of UE may be compared with an expected speed range of UE to be served by each of the one or more cells capable of being camped on. If the expected speed range of UE to be served includes the movement speed of the UE, it may be determined that a cell, whose expected speed range of UE to be served includes the movement speed of the UE, is a matching cell. For example, if the movement speed of UE is 225 km/h, and among the cells capable of being camped on, the expected speed range of UE to be served by cell 1 is greater than 200 km/h, the expected speed range of UE to be served by cell 2 is within 30~200 km/h, and the expected speed range of UE to be served by cell 3 is less than 30 km/h, it is indicated that only the expected speed range of UE to be served by cell 1 includes the movement speed of the UE.

At step 203, if there is only one matching cell among the cells capable of being camped on, the UE determines the matching cell as a cell to be camped on, and step 205 is performed.

At step 204, if there are more than two matching cells among the cells capable of being camped on, the UE determines a cell with highest signal quality among the more than two matching cells as the cell to be camped on.

At step 205, the UE camps on the cell to be camped on.

In this example, the UE may select the cell to be camped on based on its own movement speed and the expected speed range of UE to be served by each of the one or more cells. In this way, the UE selects a suitable cell to camp on according to the expected speed information of UE to be served by a network, thereby avoiding a problem that high speed movement UE selects a common public mobile network and cannot meet its own communication needs, and avoiding a problem of congestion on the high-speed-railway dedicated network caused by ordinary movement speed UE to select the high-speed railway dedicated network.

FIG. 3 is a flowchart illustrating still another method of camping on a cell according to an example. This example, by adopting the method as described above, exemplifies how UE selects a cell to camp on when the expected speed information of UE to be served indicates a speed level. As shown in FIG. 3, this method of camping on the cell includes the following steps.

At step 301, when selecting a cell to camp on, UE determines its own movement speed.

In an example, for the description of step 201, reference may be made to the description of step 101 in the example shown in FIG. 1A, which will not be described in detail here.

At step 302, the UE determines a speed level of the UE based on threshold information of speed level for classifying a speed.

In an example, the threshold information of speed level for classifying the speed may be broadcast by a base station through system signaling. The UE may obtain the threshold information of speed level for classifying the speed when monitoring the system signaling.

In an example, there may be three speed levels, such as a low speed, a medium speed, and a high speed. The threshold information of speed level for classifying the speed includes at least two thresholds. For example, a first threshold is 30 km/h, and a second threshold is 200 km/h. Based on this, a speed less than the first threshold may be determined as the low speed, a speed greater than the first threshold and less than the second threshold may be determined as the medium speed, and a speed greater than the second threshold may be determined as the high speed.

In an example, the UE may determine its own speed level based on its current movement speed and the threshold information.

At step 303, among cells capable of being camped on, the UE determines, as a matching cell, a cell whose expected speed level of UE to be served is the same as the speed level of the UE, and steps 304 and 305 are performed.

In an example, the speed level of UE may be compared with the expected speed level of the UE to be served by each of the one or more cells capable of being camped on. If the expected speed level of UE to be served is the same as the speed level of the UE, it may be determined that a cell, whose expected speed level of UE to be served is the same as the speed level of the UE, is a matching cell. For example, if the speed level of UE is medium, and among the cells capable of being camped on, the expected speed level of UE to be served by cell 1 is medium, the expected speed level of UE to be served by cell 2 is high, and the expected speed level of UE to be served by cell 3 is low, it is indicated that only the expected speed level of UE to be served by cell 1 is the same as the speed level of the UE.

At step 304, if there is only one matching cell among the cells capable of being camped on, the UE determines the matching cell as a cell to be camped on, and step 306 is performed.

At step 305, if there are more than two matching cells among the cells capable of being camped on, the UE determines a cell with highest signal quality among the more than two matching cells as the cell to be camped on.

At step 306, the UE camps on the cell to be camped on.

In this example, the UE may select the cell to be camped on based on its own speed level and the expected speed level of UE to be served by each of the one or more cells. In this way, the UE selects a suitable cell to camp on according to the expected speed level of UE to be served by a network, thereby avoiding a problem that high speed movement UE selects a common public mobile network and cannot meet its own communication needs, and avoiding a problem of congestion on the high-speed-railway dedicated network caused by ordinary movement speed UE to select the high-speed railway dedicated network.

Figure 4:
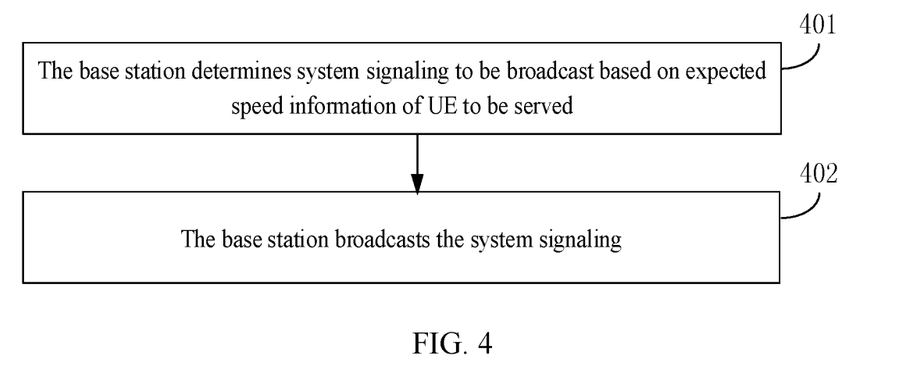
FIG. 4 is a flowchart illustrating a method of camping on a cell according to an example.

FIG. 4 is a flowchart illustrating a method of camping on a cell according to an example. The method of camping on the cell in this example may be applied to a base station. As shown in FIG. 4, the method includes the following steps 401-402.

At step 401, the base station determines system signaling to be broadcast based on expected speed information of UE to be served.

In an example, when deploying a base station, an operator may set the expected speed information of UE to be served by the base station. For example, when deploying a base station of the high-speed-railway dedicated network, an operator may set the expected speed information of UE to be served by the base station is a high speed.

In an example, in addition to expected speed information of UE to be served by the present cell, a base station may broadcast expected speed information of UE to be served by its neighboring cell through system signaling. The base station may acquire the expected speed information of UE to be served by the neighboring cell through an X2 interface between base stations.

In an example, the expected speed information of UE to be served refers to a speed range or a speed level. If the expected speed information of UE to be served refers to the speed level, the system signaling may carry threshold information of speed level for classifying a speed.

At step 402, the base station broadcasts the system signaling.

In an example, the expected speed information of UE to be served may be broadcast through minimum system signaling, for example, system signaling. In an example, a base station may broadcast the expected speed information of UE to be served through request-based system signaling. For example, the expected speed information of UE to be served is broadcast through SIB (System Information Block) type system signaling.

In this example, one or more base stations may broadcast their own expected speed information of UE to be served, so as to enable UE to select a suitable cell to camp on according to the expected speed information of UE to be served by each of one or more cells, thereby avoiding a problem that high speed movement UE selects a common public mobile network and cannot meet its own communication needs, and avoiding a problem of congestion on a high-speed-railway dedicated network caused by ordinary movement speed UE to select the high-speed railway dedicated network.

Figure 5:
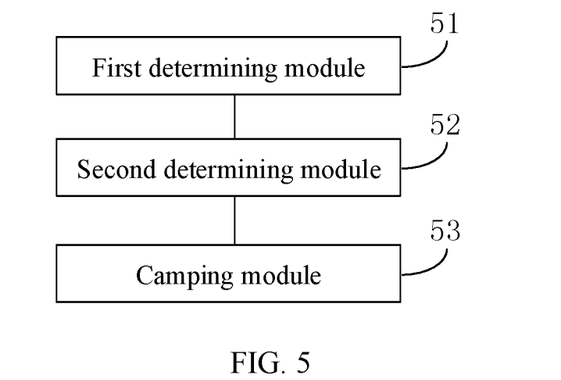
FIG. 5 is a block diagram illustrating an apparatus for camping on a cell according to an example.

FIG. 5 is a block diagram illustrating an apparatus for camping on a cell according to an example. The apparatus is applied to UE. As shown in FIG. 5, the apparatus for camping on the cell includes:

a first determining module 51 configured to, for selecting a cell to camp, determine a movement speed of the UE;

a second determining module 52 configured to determine a cell to be camped on based on the movement speed of the UE determined by the first determining module 51 and expected speed information of UE to be served by each of one or more cells capable of being camped on; and a camping module 53 configured to camp on the cell to be camped on determined by the second determining module 52.

Figure 6:
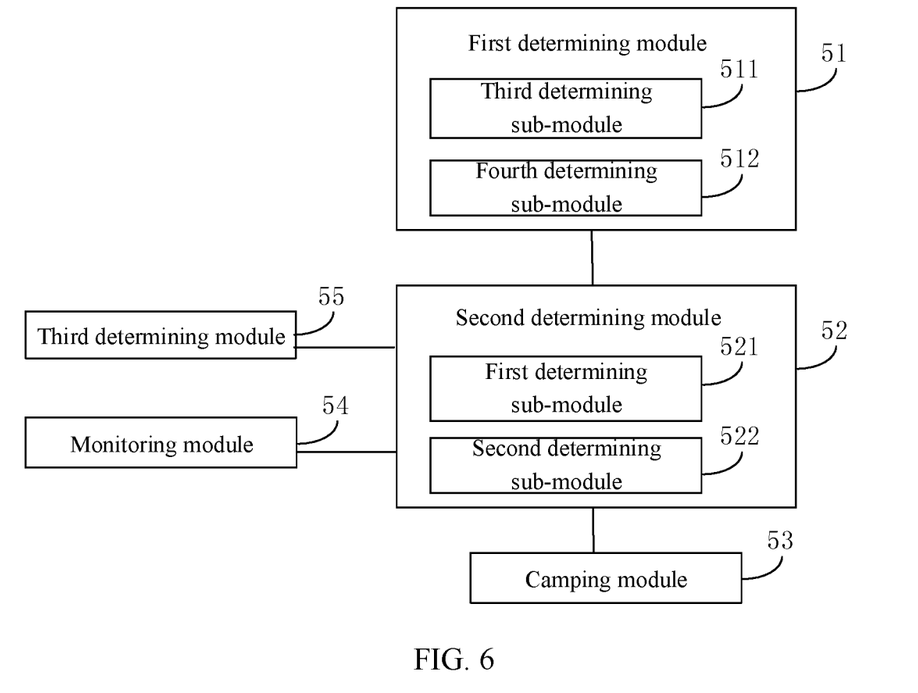
FIG. 6 is a block diagram illustrating another apparatus for camping on a cell according to an example.

FIG. 6 is a block diagram illustrating another apparatus for camping on a cell according to an example. As shown in FIG. 6, on the basis of the example shown in FIG. 5, in an example, the apparatus further includes:

a monitoring module 54 configured to monitor system signaling broadcast by a base station, wherein the system signaling carries expected speed information of UE to be served by a cell, or carries the expected speed information of UE to be served by the cell and expected speed information of UE to be served by a neighboring cell adjacent to the cell.

In an example, the expected speed information of UE to be served indicates a speed range or a speed level; and in response to that the expected speed information of UE to be served indicates the speed level, system signaling carries threshold information of speed level for classifying a speed.

In an example, the apparatus further includes:

a third determining module 55 configured to determine a speed level of the UE based on the threshold information of speed level for classifying the speed.

In an example, the second determining module 52 includes:

a first determining sub-module 521 configured to, in response to that there is only one matching cell among the one or more cells capable of being camped on, determine the matching cell as the cell to be camped on, wherein the matching cell refers to a cell whose expected speed range of UE to be served comprises the movement speed of the UE, or a cell whose expected speed level of UE to be served is the same as the speed level of the UE; and a second determining sub-module 522 configured to, in response to that there are more than two matching cells among the one or more cells capable of being camped on, determine a cell with highest signal quality among the more than two matching cells as the cell to be camped on.

In an example, the first determining module 51 includes:

a third determining sub-module 511 configured to determine the movement speed of the UE based on a number of times of performing cell re-selection by the UE within a preset time period; or a fourth determining sub-module 512 configured to determine the movement speed of the UE based on a movement trajectory within a set time period determined by a positioning module of the UE.

Figure 7:
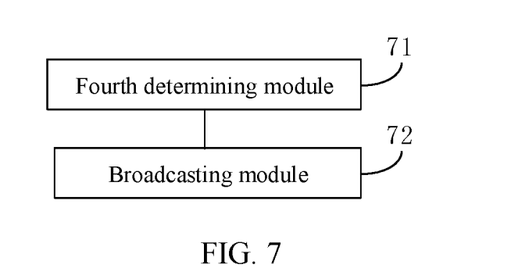
FIG. 7 is a block diagram illustrating an apparatus for camping on a cell according to an example.

FIG. 7 is a block diagram illustrating an apparatus for camping on a cell according to an example. The apparatus is applied to a base station. As shown in FIG. 7, the apparatus for camping on the cell includes:

a fourth determining module 71 configured to determine system signaling to be broadcast based on expected speed information of UE to be served; and a broadcasting module 72 configured to broadcast the system signaling.

Figure 8:
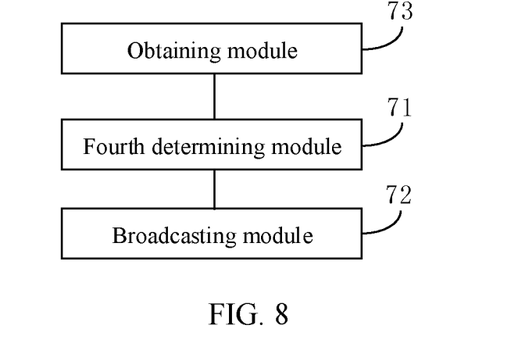
FIG. 8 is a block diagram illustrating another apparatus for camping on a cell according to an example of the present disclosure.

FIG. 8 is a block diagram illustrating another apparatus for camping on a cell according to an example. As shown in FIG. 8, on the basis of the example shown in FIG. 7, in an example, the system signaling f further carries expected speed information of UE to be served by a neighboring cell; and the apparatus further includes:

an obtaining module 73 configured to obtain the expected speed information of UE to be served by the neighboring cell through an X2 interface between base stations.

In an example, the expected speed information of UE to be served indicates a speed range or a speed level; and in response to that the expected speed information of UE to be served indicates the speed level, the system signaling further carries threshold information of speed level for classifying a speed.

Figure 9:
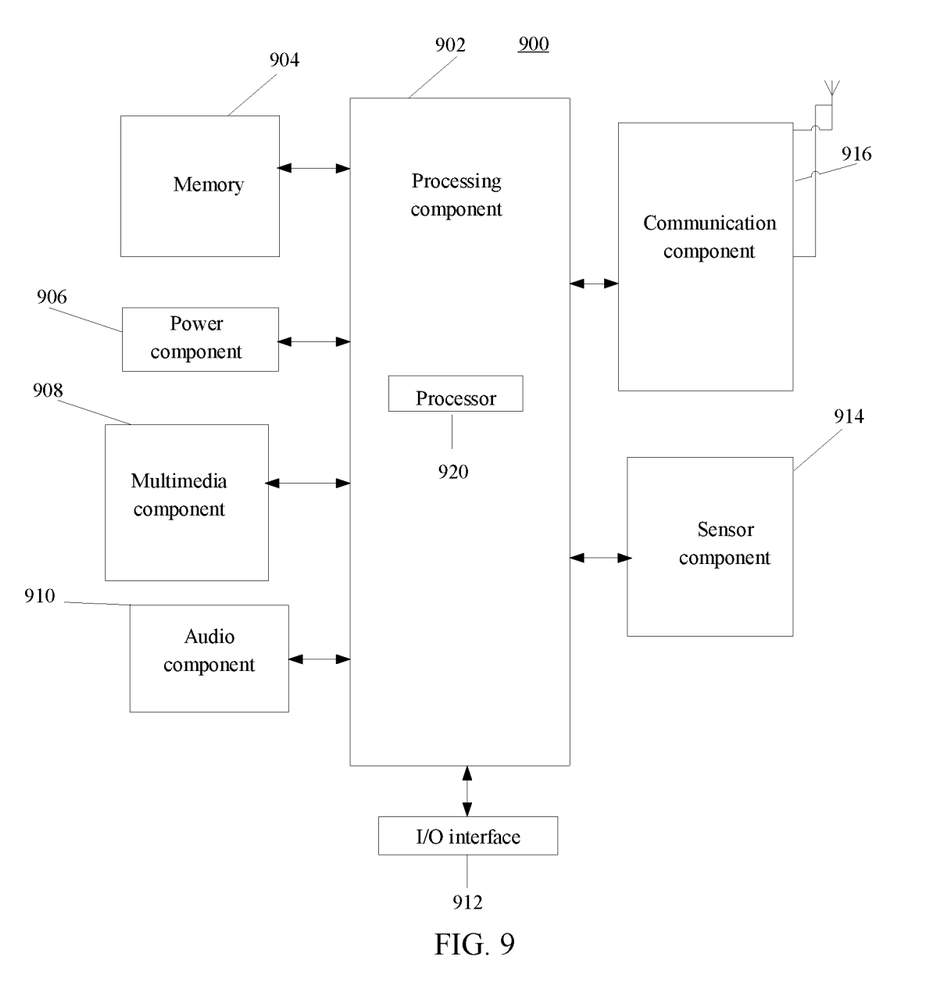
FIG. 9 is a block diagram illustrating an apparatus suitable for camping on a cell according to an example.

FIG. 9 is a block diagram illustrating an apparatus suitable for camping on a cell according to an example. For example, an apparatus 900 may be a mobile phone, a computer, a digital broadcast terminal, a messaging device, a game console, a tablet device, a medical equipment, a fitness equipment, a personal digital assistant, or other UE.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 usually controls the overall operation of the apparatus 900, such as operations associated with display, telephone calls, data communications, camera operations, and recording operations. The processing component 902 may include one or more processors 920 to execute instructions to perform all or part of the steps in the methods described above. Moreover, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support operation at the apparatus 900. Examples of these data include instructions for any application or method operating at the apparatus 900, contact data, phone book data, messages, pictures, videos, and the like. The memory 904 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a compact disk.

The power component 906 provides power to various components of the apparatus 900. The power component 906 may include a power management system, one or more power sources, and other components associated with power generated, managed, and distributed for the apparatus 900.

The multimedia component 908 includes a screen that provides an output interface between the apparatus 900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the apparatus 900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some examples, the audio component 910 also includes a loudspeaker for outputting an audio signal.

The I/O interface 912 provides an interface between the processing component 902 and a peripheral interface module which may be a keyboard, a click wheel, a button, or the like. These buttons may include, but are not limited to a home button, a volume button, a start button, and a lock button.

The sensor component 914 includes one or more sensors for providing a status assessment in various aspects to the apparatus 900. For example, the sensor component 914 may detect an open/closed state of the apparatus 900, and the relative positioning of components, for example, the component is a display and a keypad of the apparatus 900. The sensor component 914 may also detect a change in position of the apparatus 900 or a component of the apparatus 900, the presence or absence of a user in contact with the apparatus 900, the orientation or acceleration/deceleration of the apparatus 900 and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wired or wireless communication between the apparatus 900 and other devices. The apparatus 900 may access a wireless network based on a communication standard, such as WiFi, 2G or 3G, or a combination thereof. In an example, the communication component 916 receives broadcast signals or broadcast associated information from an external broadcast management system via a broadcast channel. In an example, the communication component 916 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 900 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 904 including instructions, wherein the instructions are executable by the processor 920 of the apparatus 900 to perform the method according to the first aspect as described above. For example, the non-transitory computer readable storage medium may be a ROM, a random-access memory (RAM), a CD-ROM, a magnetic tape, a floppy disk, and an optical data storage device.

The processor 920 is configured to perform the method according to the first aspect as described above.

Figure 10:
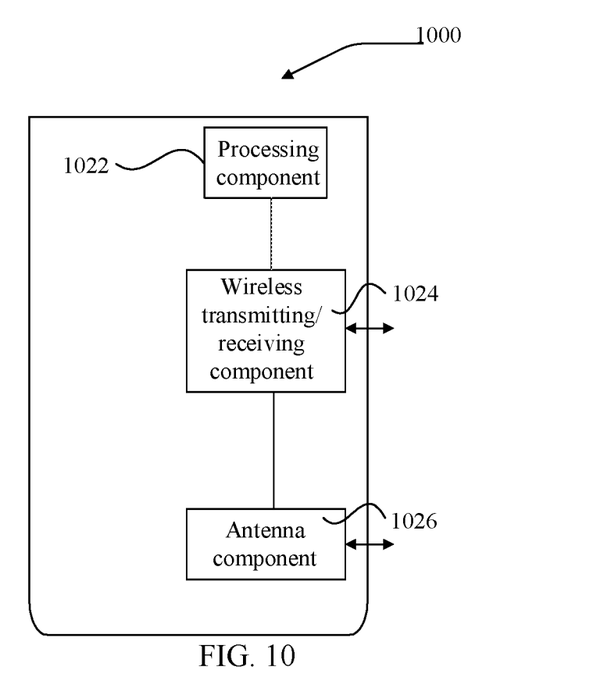
FIG. 10 is a block diagram illustrating an apparatus suitable for camping on a cell according to an example.

FIG. 10 is a block diagram illustrating an apparatus suitable for camping on a cell according to an example. An apparatus 1000 may be provided to a base station. Referring to FIG. 10, the apparatus 1000 includes a processing component 1022, a wireless transmitting/receiving component 1024, an antenna component 1026, and a signal processing portion specific to a wireless interface. The processing component 1022 may further include one or more processors.

One of the processors in the processing component 1022 may be configured to perform the method of camping on the cell according to the second aspect as described above.

In an example, there is also provided a non-transitory computer readable storage medium including instructions, wherein the instructions are executable by the processing component 1022 of the apparatus 1000 to perform the method according to the second aspect as described above. For example, the non-transitory computer readable storage medium may be a ROM, a random-access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of camping on a cell, applied to user equipment (UE), and comprising:
for selecting a cell to camp on, determining a movement speed of the UE;
monitoring system signaling broadcast by one or more base station, wherein the system signaling carries expected speed information of UE to be served by a cell and expected speed information of UE to be served by a neighboring cell adjacent to the cell;
in response to signal quality of a reference cell detected by the UE meets a camping criterion, determining the reference cell as a cell capable of being camped on;
determining a cell to be camped on based on the movement speed of the UE and respective monitored expected speed information of UE to be served by one or more cells capable of being camped on; and
camping on the cell to be camped on;
wherein for each of the cell and the neighboring cell, the expected speed information of UE to be served by the cell comprises at least one of a speed range indicating an expected movement speed of the UE to be served or a speed level indicating a speed level of the expected movement speed of the UE to be served, and in response to that the expected speed information of UE to be served comprises the speed level, the system signaling further carries threshold information of speed level for classifying a speed.

2. The method according to claim 1, wherein a speed level of the UE is determined based on the threshold information of speed level for classifying the speed.

3. The method according to claim 1, wherein the determining the cell to be camped on based on the movement speed of the UE and the respective expected speed information of UE to be served by the one or more cells capable of being camped on comprises:
in response to that there is only one matching cell among the one or more cells capable of being camped on, determining the matching cell as the cell to be camped on, wherein the matching cell refers to a cell whose expected speed range of UE to be served comprises the movement speed of the UE, or a cell whose expected speed level of UE to be served is the same as the speed level of the UE; and
in response to that there are more than two matching cells among the one or more cells capable of being camped on, determining a cell with highest signal quality among the more than two matching cells as the cell to be camped on.

4. The method according to claim 1, wherein the determining the movement speed of the UE comprises:
determining the movement speed of the UE based on a number of times of performing cell re-selection by the UE within a preset time period; or
determining the movement speed of the UE based on a movement trajectory within a set time period determined by a positioning module of the UE.

5. A non-transitory computer readable storage medium having computer instructions stored thereon, wherein the instructions are executed by a processor to perform operations of the method of claim 1.

6. A communication system implementing the method of claim 1, comprising the UE and a dedicated high-speed railway network having a plurality of cells capable of being camped on, wherein:
the UE is configured to select the cell to be camped on based on the movement speed of the UE and the expected speed information of UE to be served by each of the plurality of cells capable of being camped on, thereby avoiding the UE with high speed movement selecting a common public mobile, and avoiding congestion of the dedicated high-speed railway network caused by other UEs with non-high-speed movement speeds to select the dedicated high-speed railway network.

7. A method of camping on a cell, applied to a base station, and comprising:
determining system signaling to be broadcast based on expected speed information of UE to be served; and
broadcasting the system signaling, wherein the system signaling carries the expected speed information of UE to be served by a cell and expected speed information of UE to be served by a neighboring cell;
wherein for each of the cell and the neighboring cell, the expected speed information of UE to be served by the cell comprises at least one of a speed range indicating an expected movement speed of the UE to be served or a speed level indicating a speed level of the expected movement speed of the UE to be served, and in response to that the expected speed information of UE to be served comprises the speed level, the system signaling further carries threshold information of speed level for classifying a speed.

8. The method according to claim 7,
further comprising:
obtaining the expected speed information of UE to be served by the neighboring cell through an X2 interface between base stations.

9. A base station implementing the method of claim 7, comprising:
a processor; and memory for storing instructions executable by the processor, wherein the processor is configured to perform steps of the method.

10. The base station according to claim 9, wherein the processor is further configured to:

obtain the expected speed information of UE to be served by the neighboring cell through an X2 interface between base stations.

11. A non-transitory computer readable storage medium having computer instructions stored thereon, wherein the instructions are executed by a processor to perform operations of the method of claim 7.

12. User equipment (UE), comprising:

a processor; and memory for storing instructions executable by the processor, wherein the processor is configured to:

for selecting a cell to camp on, determine a movement speed of the UE;

monitor system signaling broadcast by one or more base station, wherein the system signaling carries expected speed information of UE to be served by a cell and expected speed information of UE to be served by a neighboring cell adjacent to the cell;

in response to signal quality of a reference cell detected by the UE meets a camping criterion, determine the reference cell as a cell capable of being camped on;

determine a cell to be camped on based on the movement speed of the UE and respective expected speed information of UE to be served by one or more cells capable of being camped on; and camp on the cell to be camped on;

wherein for each of the cell and the neighboring cell, the expected speed information of UE to be served by the cell comprises at least one of a speed range indicating an expected movement speed of the UE to be served or a speed level indicating a speed level of the expected movement speed of the UE to be served and in response to that the expected speed information of UE to be served comprises the speed level, the system signaling further carries threshold information of speed level for classifying a speed.

13. The UE according to claim 12, wherein a speed level of the UE is determined based on the threshold information of speed level for classifying the speed.

14. The UE according to claim 12 wherein the determining the cell to be camped on based on the movement speed of the UE and the respective expected speed information of UE to be served by the one or more cells capable of being camped on comprises:

in response to that there is only one matching cell among the one or more cells capable of being camped on, determining the matching cell as the cell to be camped on, wherein the matching cell refers to a cell whose expected speed range of UE to be served comprises the movement speed of the UE, or a cell whose expected speed level of UE to be served is the same as the speed level of the UE; and in response to that there are more than two matching cells among the one or more cells capable of being camped on, determining a cell with highest signal quality among the more than two matching cells as the cell to be camped on.

15. The UE according to claim 12, wherein the determining the movement speed of the UE comprises:

determining the movement speed of the UE based on a number of times of performing cell re-selection by the UE within a preset time period; or determining the movement speed of the UE based on a movement trajectory within a set time period determined by a positioning module of the UE.

\* \* \* \* \*